US010669874B2

(12) United States Patent
Filippi (10) Patent No.: US 10,669,874 B2
(45) Date of Patent: Jun. 2, 2020

(54) DISCOURAGER FOR DISCOURAGING FLOW THROUGH FLOW PATH GAPS

(71) Applicant: General Electric Company, Schenectady, NY (US)

(72) Inventor: Sergio Filippi, Montgomery, OH (US)

(73) Assignee: General Electric Company, Schenectady, NY (US)

(*) Notice: Subject to any disclaimer, the term of this patent is extended or adjusted under 35 U.S.C. 154(b) by 338 days.

(21) Appl. No.: 15/582,929

(22) Filed: May 1, 2017

(65) Prior Publication Data
US 2018/0313221 A1 Nov. 1, 2018

(51) Int. Cl.
*F01D 11/00* (2006.01)
*F02C 7/28* (2006.01)
*F01D 11/02* (2006.01)
*F01D 25/24* (2006.01)

(52) U.S. Cl.
CPC .............. *F01D 11/005* (2013.01); *F02C 7/28* (2013.01); *F01D 11/001* (2013.01); *F01D 11/02* (2013.01); *F01D 25/246* (2013.01); *F05D 2250/411* (2013.01)

(58) Field of Classification Search
CPC ...... F01D 11/00; F01D 11/001; F01D 11/005; F01D 11/02; F01D 25/246; F02C 7/28; F05D 2250/411; F16J 15/3204; F16J 15/324; F16J 15/022
USPC ........ 415/209.2–209.4, 210.1; 227/552, 644, 227/650, 653–654; 416/198 R, 198 A, 416/200 A, 201 R
See application file for complete search history.

(56) References Cited
U.S. PATENT DOCUMENTS

| | | | |
|---|---|---|---|
| 5,934,687 A | 8/1999 | Bagepalli et al. | |
| 6,398,488 B1 | 6/2002 | Solda et al. | |
| 7,059,829 B2 | 6/2006 | Garner | |
| 7,549,841 B1 | 6/2009 | Marussich | |
| 8,388,310 B1 | 3/2013 | Diakunchak | |
| 8,419,356 B2 | 4/2013 | Little | |
| 9,200,527 B2 | 12/2015 | Hafner | |
| 2003/0196305 A1* | 10/2003 | Kebbede ........... | B23P 6/005 29/402.11 |
| 2007/0158919 A1* | 7/2007 | Bennett ............. | F01D 11/005 277/644 |

(Continued)

*Primary Examiner* — Moshe Wilensky
*Assistant Examiner* — Elton K Wong
(74) *Attorney, Agent, or Firm* — Dority & Manning, P.A.

(57) ABSTRACT

Flow discouragers, flow path assemblies, and methods for assembling flow path assemblies are provided. For example, a discourager for discouraging fluid flow between adjacent first and second components comprises a first contact surface in contact with the first component; a second contact surface in contact with the second component; and a body connecting the first and second contact surfaces that includes a pocket for receipt of a retention member and a plurality of apertures defined therethrough between the first and second contact surfaces. An exemplary flow path assembly comprises adjacent first and second components and a flow discourager that includes first and second contact surfaces in contact with the first and second components, respectively. The first and second contact surfaces each have a three-dimensional geometric shape to maintain contact with the first and second components. Each discourager may be formed from a ceramic matrix composite material.

16 Claims, 6 Drawing Sheets

(56) References Cited

U.S. PATENT DOCUMENTS

| | | | |
|---|---|---|---|
| 2014/0112766 A1* | 4/2014 | Nereim | F01D 5/06 415/173.7 |
| 2016/0047258 A1* | 2/2016 | Hall | F01D 11/005 415/1 |
| 2016/0115806 A1* | 4/2016 | Davis | F01D 25/246 277/591 |
| 2016/0312634 A1 | 10/2016 | Davis et al. | |
| 2017/0306780 A1* | 10/2017 | Peters | F01D 11/025 |
| 2018/0058234 A1* | 3/2018 | Horiuchi | F02C 7/28 |

* cited by examiner

DISCOURAGER FOR DISCOURAGING FLOW THROUGH FLOW PATH GAPS

FEDERALLY SPONSORED RESEARCH

This invention was made with government support under contact number FA8626-16-C-2138 of the United States Department of Defense. The government may have certain rights in the invention.

FIELD

The present subject matter relates generally to flow path assemblies defining a path for fluid flow. More particularly, the present subject matter relates to flow path assemblies of gas turbine engines and, most particularly, to discouragers for discouraging fluid flow between adjacent components.

BACKGROUND

Non-traditional high temperature composite materials, such as ceramic matrix composite (CMC) materials, are being used in applications such as gas turbine engines. Components fabricated from CMC materials have a higher temperature capability compared with typical components, e.g., metal components, which may allow improved component performance and/or increased engine temperatures. Generally, a gas turbine engine core includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases, exposing components within the combustion section to relatively high temperatures. The combustion gases are routed from the combustion section to the turbine section. The flow of combustion gases through the turbine section drives the turbine section and is then routed through the exhaust section, e.g., to atmosphere.

More particularly, the gas turbine engine defines a flow path for routing the combustion gases through the engine. Adjacent components defining the flow path may develop gaps between the flow path components, through which hot combustion gases could be ingested into buffer cavities between the flow path and an external casing of the gas turbine engine. As such, components within the buffer cavities may be exposed to the combustion gases, such that increased cooling flow or other measures are required for the buffer cavity components to withstand the temperatures of the ingested combustion gases. Accordingly, a discourager or seal for discouraging fluid flow from the flow path into the buffer cavities through the gaps between the flow path components would be desirable, e.g., to reduce the cooling flow required within the buffer cavities and/or to increase the durability of the components within the buffer cavities. More specifically, a discourager or seal that spans a gap between two adjacent components forming the flow path would be beneficial. In particular, a discourager or seal formed from a CMC material, e.g., to withstand the temperatures of the combustion gases, would be advantageous.

BRIEF DESCRIPTION

Aspects and advantages of the invention will be set forth in part in the following description, or may be obvious from the description, or may be learned through practice of the invention.

In one exemplary embodiment of the present subject matter, a discourager for discouraging fluid flow between a first component and an adjacent second component is provided. The discourager is formed from a ceramic matrix composite material and comprises a first contact surface in contact with the first component; a second contact surface in contact with the second component; and a body connecting the first contact surface and the second contact surface. The body includes a pocket for receipt of a retention member, and a plurality of apertures defined therethrough. The plurality of apertures is defined between the first contact surface and the second contact surface.

In another exemplary embodiment of the present subject matter, a flow path assembly is provided. The flow path assembly comprises a first component; a second component adjacent the first component; and a discourager for discouraging fluid flow between the first component and the second component. The discourager is formed from a ceramic matrix composite material and includes a first contact surface in contact with the first component, a second contact surface in contact with the second component, and a body connecting the first contact surface and the second contact surface. The first contact surface and the second contact surface each have a three-dimensional geometric shape to maintain contact between the first contact surface and the first component and between the second contact surface and the second component.

In a further exemplary embodiment of the present subject matter, a method for assembling a flow path assembly is provided. The flow path assembly includes a first component, a second component adjacent the first component, and a discourager for discouraging fluid flow between the first component and the second component. The method comprises positioning the first component and the second component within the flow path assembly, and positioning the discourager within the flow path assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows.

Figure 1:
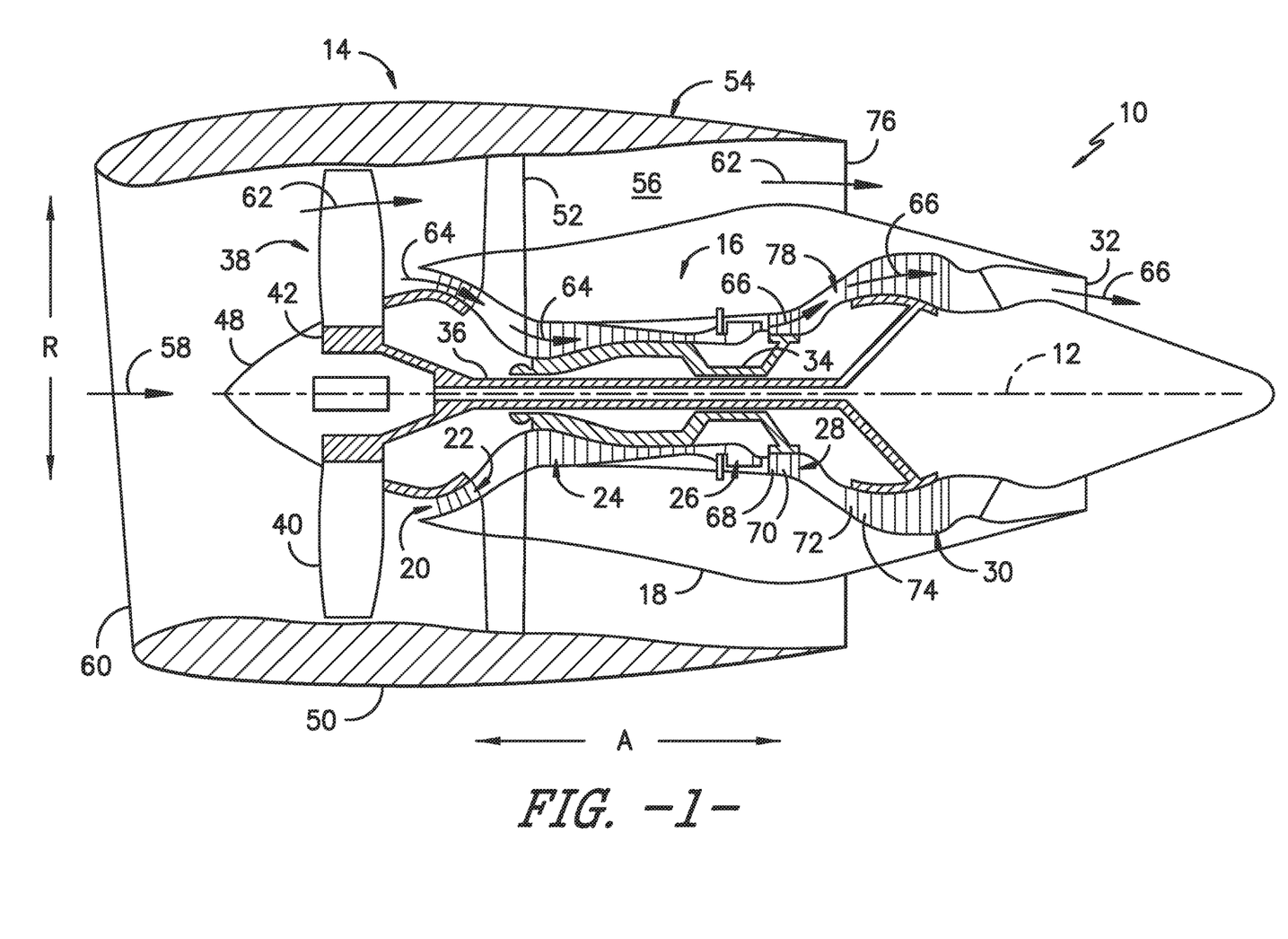
FIG. 1 provides a schematic cross-section view of an exemplary gas turbine engine according to various embodiments of the present subject matter.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. In other embodiments of turbofan engine 10, additional spools may be provided such that engine 10 may be described as a multi-spool engine.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It will be appreciated that, although described with respect to turbofan 10 having core turbine engine 16, the present subject matter may be applicable to other types of turbomachinery. For example, the present subject matter may be suitable for use with or in turboprops, turboshafts, turbojets, industrial and marine gas turbine engines, and/or auxiliary power units.

Figure 2:
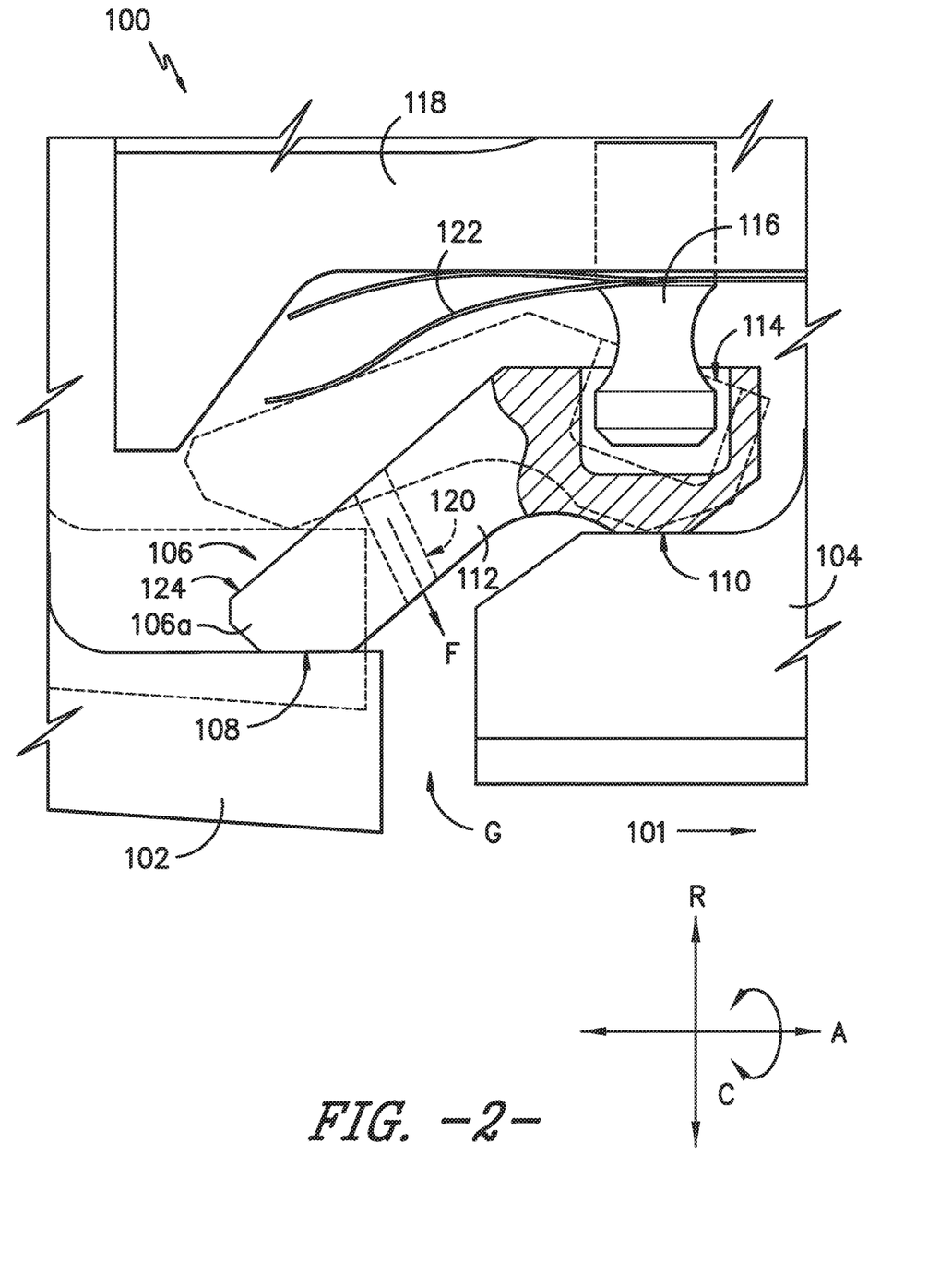
FIG. 2 provides a schematic cross-section view of a portion of a flow path assembly of the gas turbine engine having a discourager for discouraging fluid flow between two adjacent components of the flow path assembly, according to an exemplary embodiment of the present subject matter.
Figure 3:
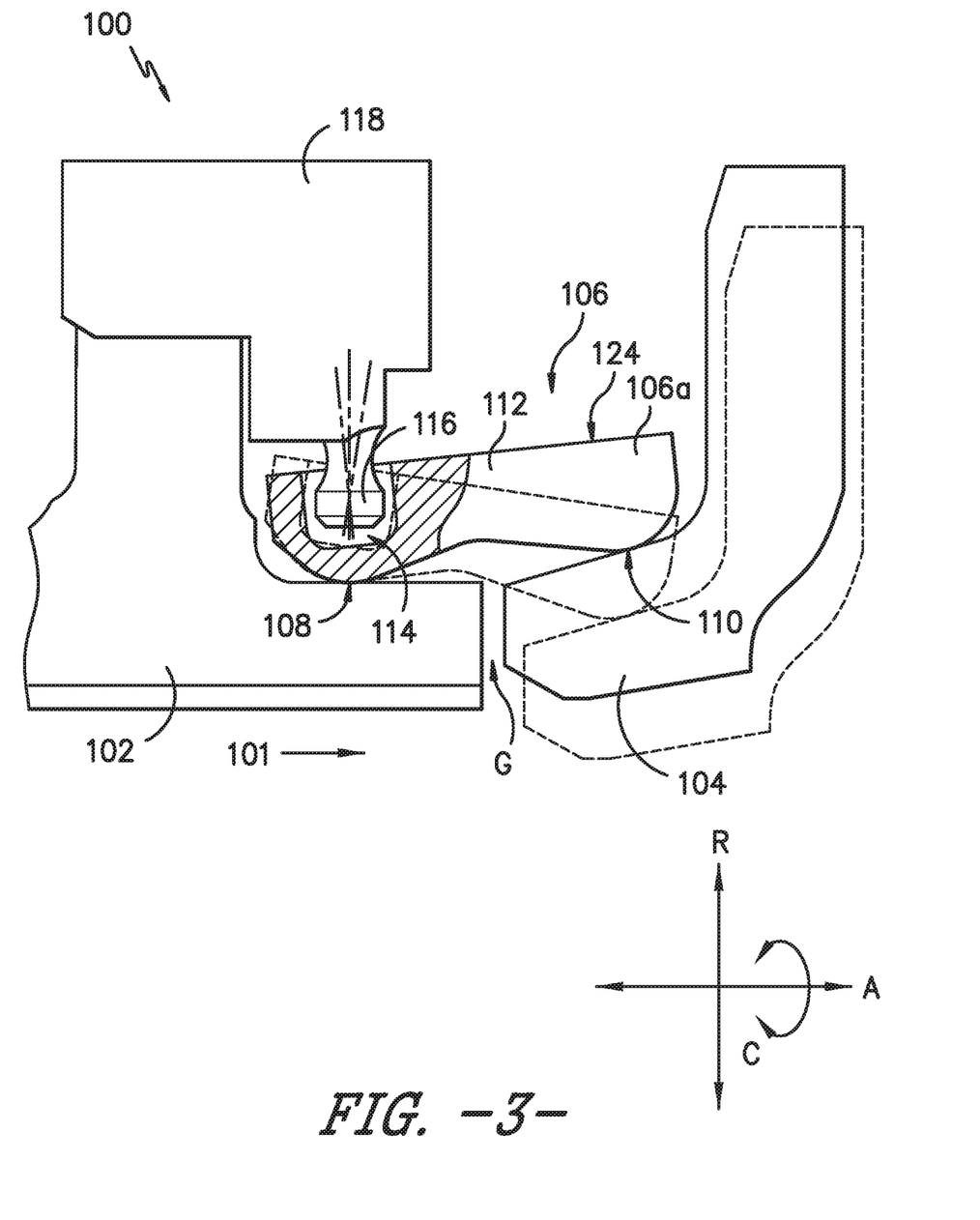
FIG. 3 provides a schematic cross-section view of a portion of a flow path assembly of the gas turbine engine having a discourager for discouraging fluid flow between two adjacent components of the flow path assembly, according to another exemplary embodiment of the present subject matter.

FIG. 2 provides a schematic cross-section view of a portion of a flow path assembly of the gas turbine engine 16 having a discourager for discouraging fluid flow between two adjacent components of the flow path assembly. Similarly, FIG. 3 provides a schematic cross-section view of a portion of a flow path assembly of the gas turbine engine 16 having a discourager for discouraging fluid flow between two adjacent components of the flow path assembly. In the exemplary embodiments depicted in FIGS. 2 and 3, the flow path assembly 100 defines a flow path 101 and comprises a first component 102 and a second component 104. The second component 104 is axially adjacent the first component 102. The discourager 106 spans a gap G between the first component 102 and the second component 104 to discourage fluid flow between the two components 102, 104. More particularly, the discourager 106 is positioned radially outward with respect to the first component 102 and the second component 104. The discourager 106 includes a first contact surface 108 that is in contact with the first component 102 and a second contact surface 110 that is in contact with the second component 104. A body 112 connects the first contact surface 108 and the second contact surface 110.

Referring still to FIGS. 2 and 3, the body 112 of discourager 106 includes a pocket 114 for receipt of a retention member 116. The pocket 114 is radially aligned with either the first contact surface 108 or the second contact surface 110 of the discourager 106. For example, as shown in FIG. 2, the pocket 114 is radially aligned with the second contact surface 110, and in FIG. 3, the pocket 114 is radially aligned with the first contact surface 108. The retention member 116 radially extends from a support member 118 external to the flow path assembly 100. The support member 118 may be a shroud hanger or other similar support. The retention member 116 may be a pin that is attached to the support member 118, a tab that is integrally formed with the support member 118, or any other suitable structure. The retention member 116 is received in the pocket 114 to hold the discourager 106 in place relative to the first and second components 102, 104, i.e., to prevent the discourager 106 from being displaced such that it loses contact with the first component 102 and/or second component 104. However, the fit between the retention member 116 and the pocket 114 is such that the discourager 106 can move relative to the retention member 116. That is, there is sufficient play or room between the retention member 116 and the pocket 114 to permit the discourager 106 to rock and/or pivot about the retention member 116. FIGS. 2 and 3 each illustrate that, as the first component 102 and the second component 104 shift positions relative to one another, the discourager 106 shifts its position relative to the retention member 116 such that the discourager 106 remains in contact with the first and second components 102, 104. More specifically, as shown in dashed lines in FIGS. 2 and 3, the location of one or both of the first contact surface 108 and the second contact surface 110 of the discourager 106 may change, e.g., generally along the radial direction R, as the first and/or second components 102, 104 change position with respect to one another. To facilitate a change in location by the first and/or second contact surfaces 108, 110, the discourager 106 rocks and/or pivots about the retention member 116 that is received in the discourager pocket 114. Accordingly, the retention member 116 fits within the pocket 114 to allow relative movement between the discourager 106 and the retention member 116. Further, although the mating faces of the pocket 114 and retention member 116 are depicted in FIGS. 2 and 3 as generally extending along the radial direction R, in other embodiments, the mating faces may be shaped to better accommodate relative motion between the discourager 106 and the retention member 116. For example, the mating faces of the pocket 114 and retention member 116 may be shaped to facilitate a rocking motion of the discourager 106 relative to the retention member 116 and/or to reduce wear and/or local stress concentrations of the discourager 106 and retention member 116.

Although only one pocket 114 and retention member 116 are shown in FIGS. 2 and 3, it will be understood that the discourager 116 may define more than one pocket 114, each pocket 114 configured for receipt of a retention member 116. More particularly, the discourager 106 may define at least two pockets 114 that are spaced apart from one another along a circumferential direction C. That is, as described in greater detail below, the discourager 106 may be generally annular, such that a circumference of the discourager 106 is generally defined along or parallel to the circumferential direction C. A retention member 116 may be received in each pocket 114, with each retention member 116 extending from the support member 118 as described above. Moreover, the support member 118 may be generally annular such that the retention members 116 are spaced apart from one another along the circumferential direction C. Whether one pocket 114 and retention member 116 or more than one pocket 114 and retention member 116 are used, the receipt of a retention member 116 within a pocket 114 of the discourager 106 helps to locate and retain the discourager 106 within the flow path assembly 100.

Additionally or alternatively, the discourager 106 may be held in place by one or more radial walls or stops. For instance, the first component 102 may include a radially extending wall or surface that is adjacent a forward end of the discourager 106 and the second component 104 may include a radially extending wall or surface adjacent an aft end of the discourager 106, such that the discourager 106 is restrained axially by the radially extending walls of the first and second components 102, 104. The first and second components 102, 104 also may include other walls or surfaces for constraining radial and/or circumferential movement of the discourager 106. Similarly, the support member 118, rather than the first and/or second components 102, 104, may define one or more radially extending walls or surfaces for constraining axial, radial, and/or circumferential movement of the discourager 106. Of course, other features also may be used to restrain the discourager 106 along the axial direction A, radial direction R, and/or circumferential direction C.

Further, the discourager body 112 defines at least one aperture 120 therethrough; preferably, the body 112 defines a plurality of apertures 120 therethrough. The apertures 120 are defined in the body 112 between the first contact surface 108 and the second contact surface 110, and the apertures may be spaced apart from one another along the circumferential direction C and/or the axial direction A. The apertures 120 are located in the body to direct a flow of cooling or purge fluid F to flow into the gap G, which may provide some cooling to the first component 102, the second component 104, and the discourager 106. The flow of fluid F also may help discourage flow from the flow path 101 through the gap G. In other embodiments, the aperture or apertures 120 may be omitted; that is, the discourager body 112 may not define any apertures 120.

The first contact surface 108 and the second contact surface 110 of the discourager 106 may be shaped to promote sealing between the discourager 106 and the first and second components 102, 104, as well as to allow relative motion, e.g., through thermal growth or deflection, between the first and second components 102, 104 and between the components 102, 104 and the discourager 106. In some embodiments, as depicted in FIG. 3, the first contact surface 108 and the second contact surface 110 each have a hyperbolic shape to maintain contact between the first contact surface 108 and the first component 102 and between the second contact surface 110 and the second component 104. That is, each of the first contact surface 108 and second contact surface 110 resemble or are shaped as hyperbolas, and the first contact surface 108 may have a different hyperbolic shape than the second contact surface 110. In other embodiments, other three-dimensional geometric shapes may be suitable for maintaining contact between the first contact surface 108 and the first component 102 and between the second contact surface 110 and the second component 104, despite any relative movement between the first and second components 102, 104. For example, the first and second contact surfaces 108, 110 may have a revolved cylinder or spherical shape, or another suitable geometric shape for ensuring contact between the discourager 106 and the first and second components 102, 104. Again, the first contact surface 108 and second contact surface 110 need not have the same shape, but each may have a suitable shape for maintaining the respective contact surface 108, 110 in contact with the respective component 102, 104.

Referring particularly to FIG. 2, an alignment member 122 may be positioned in contact with the support member 118 and the discourager 106, e.g., to help align the discourager 106 with respect to the first component 102 and the second component 104 and/or to help keep the discourager 106 in contact with the first and second components 102, 104. More specifically, as shown in FIG. 2, the alignment member 122 contacts the discourager body 106 on a surface 124 opposite the first and second contact surfaces 108, 110. The alignment member 122 may be a leaf spring, a finger spring, a spring formed from a thin sheet metal having a different shape than a leaf or finger spring, or any other suitable structure for keeping the discourager 106 aligned and/or in contact with the first component 102 and the second component 104. Of course, the discourager 106 may be held in place by other and/or additional means as well. For instance, when the gas turbine engine is in operation, a pressure difference develops between the radially inner and radially outer surfaces of the discourager 106. The pressure difference helps keep the discourager 106 pressed against or in contact with the first component 102 and the second component 104, thereby enhancing the seal between the discourager 106 and the first and second components 102, 104. Accordingly, the alignment member 122 may be particularly helpful in keeping the discourager 106 suitably aligned when the engine is off or non-operational, while the pressure differential radially across the discourager 106 helps keep the discourager 106 in place when the engine is on or operational.

It will be appreciated that the flow path assembly 100 may define a generally annular flow path 101 and, for example, may define at least a portion of the hot gas path 78 through the combustion and turbine sections 26, 28, 30 of the gas turbine engine 16. In such embodiments, the first component 102 is generally annular and the second component 104 is generally annular. For example, as shown in FIG. 2, the first component 102 may be a turbine nozzle and the second component 104 may be a shroud of the HP turbine section 28 or the LP turbine section 30. The turbine nozzle 102 may be formed from a plurality of nozzle segments, and the shroud 104 may be formed from a plurality of shroud segments. As another example, depicted in FIG. 3, the first component 102 may be a shroud and the second component 104 may be a turbine nozzle, which may be formed from a plurality of shroud segments and nozzle segments, respectively. In other embodiments, the first component 102 may be a combustor liner and the second component 104 may be a combustion discharge turbine nozzle, i.e., the turbine nozzle immediately downstream of the combustor, and in still other embodiments, the first and second components 102, 104 may be other adjacent components of a flow path assembly 100 of engine 16.

In any event, where the first and second components 102, 104 are generally annular components, the discourager 106 should be generally annular to span the gap G between the generally annular first and second components 102, 104 and thereby discourage fluid flow through the gap G. In an exemplary embodiment, the discourager 106 comprises a plurality of segments, such as discourager segment 106a shown in FIGS. 2 and 3, which are positioned adjacent to one another along the circumferential direction C to form a generally annular discourager 106. A spline seal or other suitable sealing member may extend between adjacent edges of each discourager segment to increase the discouraging and/or sealing capabilities of the discourager 106. That is, to avoid having gaps between adjacent discourager segments that could allow relatively hot gases from the flow path 100 therethrough, a sealing member may extend along the interface between adjacent discourager segments, e.g., from one discourager segment edge to an adjacent discourager segment edge, to substantially seal such gaps and prevent fluid flow between the discourager segments.

The number of discourager segments may be the same as or different from the number of segments forming the first component 102 and/or the second component 104. As one example, the first component 102 may be a turbine nozzle formed from a plurality of nozzle segments as previously described, and the number of segments forming the discourager 106 may be the same as the number of nozzle segments forming the turbine nozzle 102 or may be different from, i.e., more or less than, the number of nozzle segments forming the turbine nozzle 102. Each discourager segment, such as the depicted segment 106a, may comprise the features as described above with respect to discourager 106, e.g., first and second contact surfaces 108, 110, body 112, one or more pockets 114, and surface 124.

Further, one or more coatings may be applied to the discourager 106, e.g., to protect the discourager 106 from environmental conditions, use conditions, and the like. For instance, an environmental barrier coating (EBC) may be applied to the discourager 106 to protect it from substances it may encounter, or a thermal barrier coating (TBC) may be applied to protect the discourager 106 from relatively high temperatures it may experience. As another example, a wear coating may be applied to the discourager 106 to prevent wear on the contact surfaces 108, 110, as well as the surface 124 against which the alignment member 122 presses. As previously described, the first component 102 and the second component 104 may move relative to one another along the radial direction R, and the components 102, 104 may also move relative to one another along the axial direction A and the circumferential direction C. Because the discourager 106 is shaped to maintain contact with the first and second components 102, 104 and is held against the components 102, 104, e.g., by the engine pressures, the alignment member 122, and the retention member 116, the discourager 106 may accommodate changes in position of the components 102, 104 by sliding or other motion between the first contact surface 108 and the first component 102 and the second contact surface 110 and the second component 104. Such motion between the discourager 106 and the first and second components 102, 104 while the discourager 106 is in contact with the components 102, 104 could cause the discourager 106 and/or the components 102, 104 to wear. Therefore, a wear coating may be applied to the discourager 106 to limit and/or avoid negative effects of such contact and movement between the components.

Of course, the one or more coatings may not be applied to the entire surface area of the discourager 106 but may be selectively applied to the discourager. For example, a wear coating may be applied only to the first contact surface 108, the second contact surface 110, and a portion of the surface 124. Additionally or alternatively, one or more coatings also may be applied to the first component 102 and/or second component 104 to protect those components of the flow path assembly 100.

Figure 4:
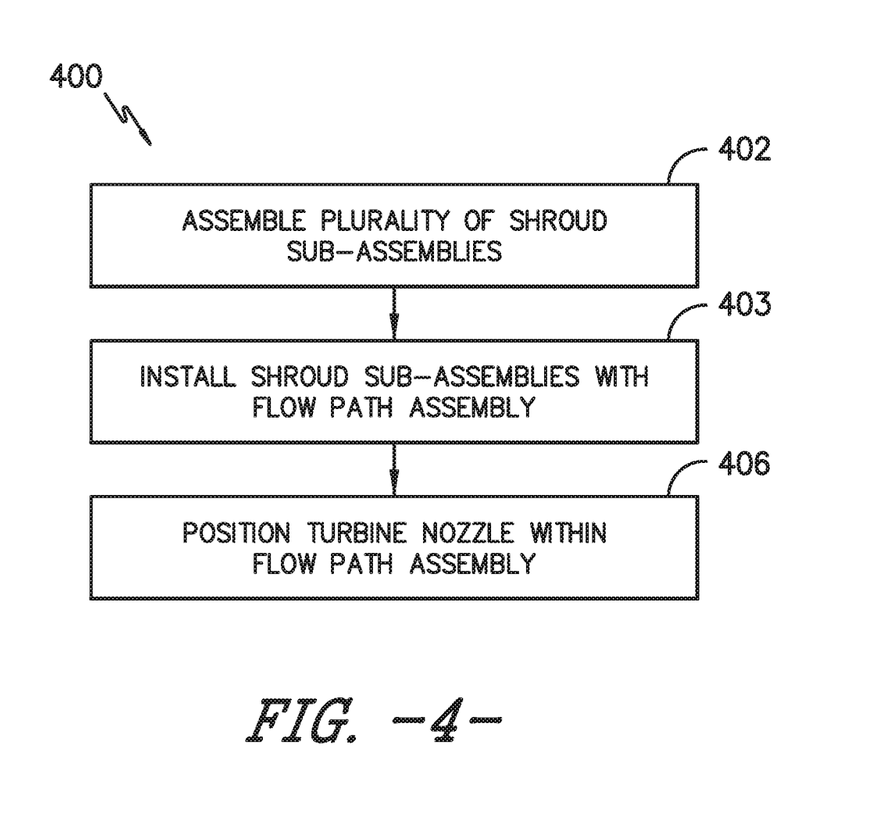
FIGS. 4, 5, and 6 provide flow diagrams illustrating methods for assembling flow path assemblies according to exemplary embodiments of the present subject matter.

The first component 102, second component 104, and discourager 106 may be assembled in the flow path assembly 100 in several ways. For instance, an exemplary flow path assembly method includes positioning the first component 102 and the second component 104 within the flow path assembly 100. More particularly, FIG. 4 provides a flow diagram of one method 400 for assembling the flow path assembly 100 according to an exemplary embodiment of the present subject matter. As shown in FIG. 4, the exemplary method 400 includes assembling a plurality of shroud sub-assemblies, as shown at 402 in FIG. 4. Each shroud sub-assembly comprises a shroud segment, a shroud hanger segment, and a discourager segment. Then, as shown at 404 in FIG. 4, the shroud sub-assemblies are installed within the flow path assembly 100 as an annular structure, i.e., a 360° ring that extends about a centerline such as axial centerline 12 of engine 10 when installed in engine 10. In some embodiments, installing the plurality of shroud sub-assemblies within the flow path assembly 100 may comprise positioning each shroud sub-assembly within the flow path assembly 100 such that the annular shroud structure, which includes the shroud, shroud hanger, and discourager 106, is assembled within the flow path assembly. In other embodiments, the plurality of shroud sub-assemblies may be assembled as the annular shroud structure outside of the flow path assembly 100, such that the annular shroud structure then is inserted into and installed within the flow path assembly 100. After the annular shroud structure is installed within the flow path assembly 100, a plurality of turbine nozzle segments are positioned within the flow path assembly 100, as shown at 406 in FIG. 4, to form an annular turbine nozzle assembly that interfaces with the discourager 106 as previously described.

It will be appreciated that the shroud of method 400 may be either the first component 102 or the second component 104, such that the turbine nozzle is the second component 104 if the shroud is the first component 102 and the turbine nozzle is the first component 102 if the shroud is the second component 104. As such, in embodiments where the turbine nozzle is the first component 102, the turbine nozzle 102 may be inserted through a forward end of the flow path assembly 100 to position the turbine nozzle 102 with respect to the installed shroud 104. Likewise, in embodiments where the turbine nozzle is the second component 104, the turbine nozzle 104 may be inserted through an aft end of the flow path assembly 100 to position the turbine nozzle 104 with respect to the installed shroud 102. Further, the shroud hanger described with respect to method 400 may be the support member 118 illustrated in FIGS. 2 and 3.

Figure 5:
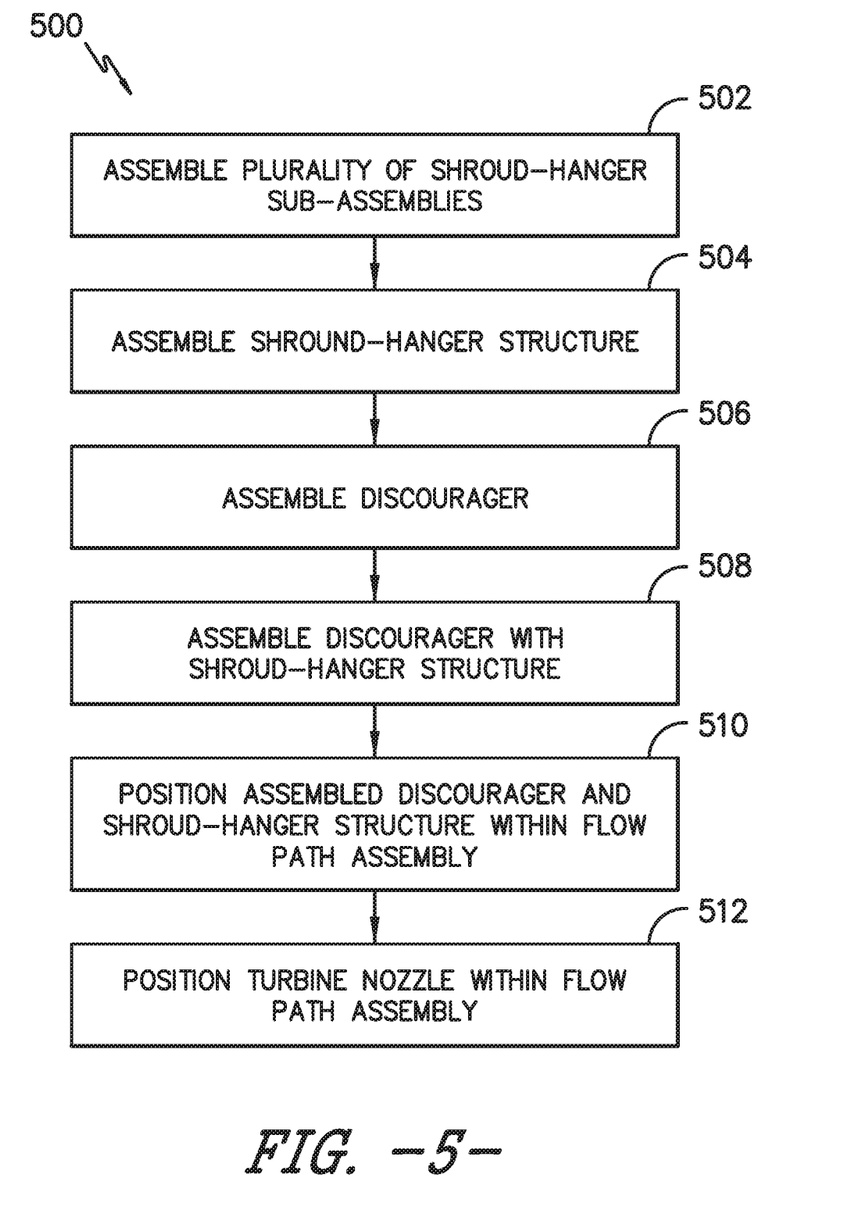

FIG. 5 provides a flow diagram of a method for assembling a flow path assembly according to another exemplary embodiment of the present subject matter. The exemplary method 500 of FIG. 5 is similar to the exemplary method 400 depicted in FIG. 4, except that the discourager 106 is not assembled with the shroud and shroud hanger to form a sub-assembly that includes the shroud, shroud hanger, and discourager 106. Rather, method 500 includes assembling a plurality of shroud-hanger sub-assemblies as shown at 502, where each shroud-hanger sub-assembly includes a shroud segment and a shroud hanger segment. As shown at 504 in FIG. 5, the plurality of shroud-hanger sub-assemblies are then assembled as an annular shroud-hanger structure, i.e., a 360° ring that extends about a centerline such as axial centerline 12 of engine 10 when installed in engine 10, either within the flow path assembly 100 or outside of the flow path assembly 100. Referring to 506 in FIG. 5, the discourager 106 may be formed from a plurality of discourager segments, such as discourager segment 106a, as previously described, such that method 500 includes assembling the plurality of discourager segments as an annular discourager 106, i.e., a 360° ring that extends about a centerline such as axial centerline 12 of engine 10 when installed in engine 10. Then, as shown at 508, the annular discourager 106 is assembled with the annular shroud-hanger structure, either within the flow path assembly 100 if the shroud-hanger structure is within the flow path assembly or outside the flow path assembly 100 if the shroud-hanger structure has been assembled outside of the flow path assembly. If the discourager 106 is assembled with the shroud-hanger structure outside of the flow path assembly 100, the method 500 includes positioning the assembled discourager and shroud-hanger rings within the flow path assembly as shown at 510 in FIG. 5. If the discourager 106 is assembled with the shroud-hanger structure within the flow path assembly 100, the step of positioning the assembled discourager and shroud-hanger rings is omitted. As shown at 512 in FIG. 5, after the shroud, shroud hanger, and discourager 106 are positioned within the flow path assembly 100, a plurality of turbine nozzle segments are positioned within the flow path assembly 100 to form an annular turbine nozzle assembly that interfaces with the discourager 106 as previously described.

In one variation of method 500, the discourager 106 is positioned within the flow path assembly 100 before the shroud-hanger structure is installed within the flow path assembly 100. In such embodiments, the discourager 106 may be assembled within the flow path assembly 100 from a plurality of discourager segments, or the plurality of discourager segments may be assembled to form the discourager 106 outside of the flow path assembly 100 and then the assembled discourager 106 positioned within the flow path assembly 100. Likewise, after the discourager 106 is positioned within the flow path assembly 100, the shroud-hanger structure may be installed within the flow path assembly 100 by assembling the structure from the plurality of shroud-hanger sub-assemblies within the flow path assembly. Alternatively, the shroud-hanger structure may be assembled from the shroud-hanger sub-assemblies outside of the flow path assembly 100 and then the assembled structure may be positioned within the flow path assembly 100 such that the shroud interfaces with the discourager 106 as previously described.

It will be appreciated that, similar to method 400, the shroud of method 500 may be either the first component 102 or the second component 104, such that the turbine nozzle is the second component 104 if the shroud is the first component 102 and the turbine nozzle is the first component 102 if the shroud is the second component 104. As such, in embodiments where the turbine nozzle is the first component 102, the turbine nozzle 102 may be inserted through a forward end of the flow path assembly 100 to position the turbine nozzle 102 with respect to the installed shroud 104. Likewise, in embodiments where the turbine nozzle is the second component 104, the turbine nozzle 104 may be inserted through an aft end of the flow path assembly 100 to position the turbine nozzle 104 with respect to the installed shroud 102. Further, the shroud hanger described with respect to method 500 may be the support member 118 illustrated in FIGS. 2 and 3.

Figure 6:
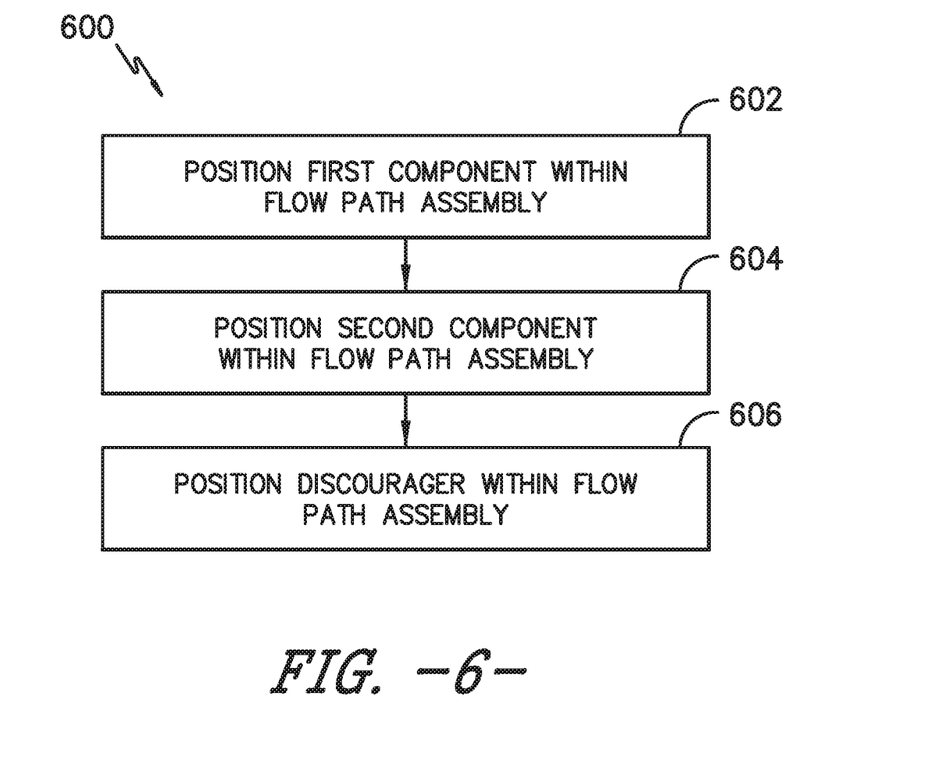

FIG. 6 provides a flow diagram of a method for assembling the flow path assembly 100 according to another exemplary embodiment of the present subject matter. As depicted in the flow diagram of FIG. 6, the method 600 includes positioning the discourager 106 within the flow path assembly 100 after the first component 102 and the second component 104 are positioned within the flow path assembly 100. That is, the first component 102 is positioned within the flow path assembly 100, as shown at 602 in FIG. 6, the second component is positioned within the flow path assembly 100, as shown at 604, and then the discourager 106 is positioned within the flow path assembly 100, as shown at 606. In some embodiments, the first component 102 is a turbine nozzle and the second component 104 is a shroud; in other embodiments, the first component 102 is a shroud and the second component 104 is a turbine nozzle. Where the first or second component 102, 104 is a shroud, positioning the component within the flow path assembly may include first assembling a plurality of shroud-hanger sub-assemblies, next assembling the shroud-hanger sub-assemblies as a shroud-hanger structure, then positioning the shroud-hanger structure within the flow path assembly 100. In embodiments of method 600 in which the discourager 106 is restrained using retention members 116 received in discourager pockets 114, the retention members 116 may be removable or inserted after the discourager 106 is installed to permit positioning of the discourager 106 within the flow path assembly 100. Further, in a variation of method 600, the second component 104 may be positioned within the flow path assembly 100 before the first component 102 is positioned within the assembly 100.

It will be appreciated that in any of the foregoing embodiments of an assembly method, the first component 102, the second component 104, and/or the discourager 106 may comprise a plurality of segments that together make up the respective component 102, 104, 106. As such, positioning a component within the flow path assembly 100 as described may include positioning a plurality of component segments within the flow path assembly 100 to form the respective component 102, 104, 106. Alternatively, in some embodiments, the first component 102, the second component 104, and/or the discourager 106 may be a single piece component, i.e., not formed from a plurality of segments. Similarly, the support member 118, which may be a shroud hanger as described above, may be a single or multi-piece support member 118. That is, the support member 118 may be formed from a plurality of segments or may be a single piece component.

In exemplary embodiments, the discourager 106, including the plurality of discourager segments 106a, etc. if the discourager 106 comprises a plurality of segments, is formed from a ceramic matrix composite (CMC) material, which is a non-metallic material having high temperature capability. The first component 102 and the second component 104 also may be formed from a CMC material. For example, the first component 102 may be a CMC turbine nozzle, and the second component 104 may be a CMC shroud. As another example, the first component 102 may be a CMC shroud, and the second component 104 may be a CMC turbine nozzle. It may be particularly useful to utilize CMC materials for components within the hot gas path 78, but other components of turbofan engine 10, such as components of HP compressor 24, also may comprise a CMC material. Exemplary CMC materials utilized for such components may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration or chemical vapor infiltration with silicon, to arrive at a component formed of a CMC material having a desired chemical composition. In other embodiments, the CMC material may be formed as, e.g., a carbon fiber cloth rather than as a tape.

More specifically, examples of CMC materials, and particularly SiC/Si—SiC (fiber/matrix) continuous fiber-reinforced ceramic composite (CFCC) materials and processes, are described in U.S. Pat. Nos. 5,015,540; 5,330,854; 5,336,350; 5,628,938; 6,024,898; 6,258,737; 6,403,158; and 6,503,441, and U.S. Patent Application Publication No. 2004/0067316. Such processes generally entail the fabrication of CMCs using multiple pre-impregnated (prepreg) layers, e.g., the ply material may include prepreg material consisting of ceramic fibers, woven or braided ceramic fiber cloth, or stacked ceramic fiber tows that has been impregnated with matrix material. In some embodiments, each prepreg layer is in the form of a "tape" comprising the desired ceramic fiber reinforcement material, one or more precursors of the CMC matrix material, and organic resin binders. Prepreg tapes can be formed by impregnating the reinforcement material with a slurry that contains the ceramic precursor(s) and binders. Preferred materials for the precursor will depend on the particular composition desired for the ceramic matrix of the CMC component, for example, SiC powder and/or one or more carbon-containing materials if the desired matrix material is SiC. Notable carbon-containing materials include carbon black, phenolic resins, and furanic resins, including furfuryl alcohol ($C_4H_3OCH_2OH$). Other typical slurry ingredients include organic binders (for example, polyvinyl butyral (PVB)) that promote the flexibility of prepreg tapes, and solvents for the binders (for example, toluene and/or methyl isobutyl ketone (MIBK)) that promote the fluidity of the slurry to enable impregnation of the fiber reinforcement material. The slurry may further contain one or more particulate fillers intended to be present in the ceramic matrix of the CMC component, for example, silicon and/or SiC powders in the case of a Si—SiC matrix. Chopped fibers or whiskers or other materials also may be embedded within the matrix as previously described. Other compositions and processes for producing composite articles, and more specifically, other slurry and prepreg tape compositions, may be used as well, such as, e.g., the processes and compositions described in U.S. Patent Application Publication No. 2013/0157037.

The resulting prepreg tape may be laid-up with other tapes, such that a CMC component formed from the tape comprises multiple laminae, each lamina derived from an individual prepreg tape. Each lamina contains a ceramic fiber reinforcement material encased in a ceramic matrix formed, wholly or in part, by conversion of a ceramic matrix precursor, e.g., during firing and densification cycles as described more fully below. In some embodiments, the reinforcement material is in the form of unidirectional arrays of tows, each tow containing continuous fibers or filaments. Alternatives to unidirectional arrays of tows may be used as well. Further, suitable fiber diameters, tow diameters, and center-to-center tow spacing will depend on the particular application, the thicknesses of the particular lamina and the tape from which it was formed, and other factors. As described above, other prepreg materials or non-prepreg materials may be used as well.

After laying up the tapes or plies to form a layup, the layup is debulked and, if appropriate, cured while subjected to elevated pressures and temperatures to produce a preform. The preform is then heated (fired) in a vacuum or inert atmosphere to decompose the binders, remove the solvents, and convert the precursor to the desired ceramic matrix material. Due to decomposition of the binders, the result is a porous CMC body that may undergo densification, e.g., melt infiltration (MI), to fill the porosity and yield the CMC component. Specific processing techniques and parameters for the above process will depend on the particular composition of the materials. For example, silicon CMC components may be formed from fibrous material that is infiltrated with molten silicon, e.g., through a process typically referred to as the Silcomp process. Another technique of manufacturing CMC components is the method known as the slurry cast melt infiltration (MI) process. In one method of manufacturing using the slurry cast MI method, CMCs are produced by initially providing plies of balanced two-dimensional (2D) woven cloth comprising silicon carbide (SiC)-containing fibers, having two weave directions at substantially 90° angles to each other, with substantially the same number of fibers running in both directions of the weave. The term "silicon carbide-containing fiber" refers to a fiber having a composition that includes silicon carbide, and preferably is substantially silicon carbide. For instance, the fiber may have a silicon carbide core surrounded with carbon, or in the reverse, the fiber may have a carbon core surrounded by or encapsulated with silicon carbide.

Other techniques for forming CMC components include polymer infiltration and pyrolysis (PIP) and oxide/oxide processes. In PIP processes, silicon carbide fiber preforms are infiltrated with a preceramic polymer, such as polysilazane and then heat treated to form a SiC matrix. In oxide/oxide processing, aluminum or alumino-silicate fibers may be pre-impregnated and then laminated into a preselected geometry. Components may also be fabricated from a carbon fiber reinforced silicon carbide matrix (C/SiC) CMC. The C/SiC processing includes a carbon fibrous preform laid up on a tool in the preselected geometry. As utilized in the slurry cast method for SiC/SiC, the tool is made up of graphite material. The fibrous preform is supported by the tooling during a chemical vapor infiltration process at about 1200° C., whereby the C/SiC CMC component is formed. In still other embodiments, 2D, 2.5D, and/or 3D preforms may be utilized in MI, CVI, PIP, or other processes. For example, cut layers of 2D woven fabrics may be stacked in alternating weave directions as described above, or filaments may be wound or braided and combined with 3D weaving, stitching, or needling to form 2.5D or 3D preforms having multiaxial fiber architectures. Other ways of forming 2.5D or 3D preforms, e.g., using other weaving or braiding methods or utilizing 2D fabrics, may be used as well.

Thus, a variety of processes may be used to form a CMC discourager 106. Further, by utilizing a CMC discourager 106 to discourage fluid flow through a gap between two adjacent flow path components, hot gas may be discouraged and/or prevented from being ingested through the gap and into cavities outside of the flow path, such as buffer cavities between the flow path and an outer casing. The CMC material increases the durability of the discourager 106, particularly against the relatively hot temperatures of the hot gas flow path 78. Further, as described above, the discourager 106 may be shaped to maintain contact between the discourager 106 and the two adjacent flow path components such that the discourager 106 may continue to discourager fluid flow through the gap between the flow path components. Of course, other advantages also may be realized from the subject matter described herein.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A discourager for discouraging fluid flow between a first component and an adjacent second component of a gas turbine engine, comprising:
   a first contact surface configured to contact the first component;
   a second contact surface configured to contact the second component; and
   a body connecting the first contact surface and the second contact surface, the body including:
      a pocket for receipt of a retention member, the pocket radially aligned with either the first contact surface or the second contact surface, and
      a plurality of apertures defined therethrough, the plurality of apertures defined between the first contact surface and the second contact surface,
   wherein the first contact surface and the second contact surface each have a hyperbolic shape to maintain contact between the first contact surface and the first component and between the second contact surface and the second component, and
   wherein the discourager is formed from a ceramic matrix composite material.

2. The discourager of claim 1, wherein the body defines at least two pockets, each pocket configured for receipt of a retention member.

3. The discourager of claim 2, wherein each retention member fits within one of the pockets to allow relative movement between the discourager and the retention member.

4. The discourager of claim 1, wherein the body is configured to contact an alignment member on a surface opposite the first contact surface and the second contact surface to align the discourager with respect to the first component and the second component.

5. The discourager of claim 1, wherein the first component is generally annular and the second component is generally annular, and wherein the discourager comprises a plurality of discourager segments positioned adjacent to one another along a circumferential direction to form a generally annular discourager.

6. The discourager of claim 1, wherein the first component is formed from a ceramic matrix composite material, and wherein the second component is formed from a ceramic matrix composite material.

7. The discourager of claim 1, wherein the body comprises a third surface radially opposite the first contact surface and the second contact surface, and wherein at least a portion of the third surface is oblique to both the first contact surface and the second contact surface.

8. A flow path assembly of a gas turbine engine, comprising:
   a first component;
   a second component adjacent the first component;
   a retention member; and
   a discourager for discouraging fluid flow between the first component and the second component, the discourager including:
      a first contact surface in contact with the first component,
      a second contact surface in contact with the second component, and
      a body connecting the first contact surface and the second contact surface, the body defining a pocket for receipt of the retention member,
   wherein both the retention member and the pocket are radially aligned with either the first contact surface or the second contact surface,
   wherein the first contact surface and the second contact surface each have a three-dimensional geometric shape to maintain contact between the first contact surface and the first component and between the second contact surface and the second component,
   wherein the first component is a shroud and the second component is a turbine nozzle, and
   wherein the discourager is formed from a ceramic matrix composite material.

9. The flow path assembly of claim 8, wherein a gap is defined between the first component and the second component, and wherein the body of the discourager defines at least one aperture therein to direct a flow of fluid into the gap.

10. The flow path assembly of claim 8, wherein the retention member extends from a support member into the pocket, and wherein the support member is external to the flow path assembly.

11. The flow path assembly of claim 8, further comprising an alignment member that contacts the body on a surface opposite the first contact surface and the second contact surface to align the discourager with respect to the first component and the second component.

12. The flow path assembly of claim 8, wherein the shroud is formed from a ceramic matrix composite material, and wherein the turbine nozzle is formed from a ceramic matrix composite material.

13. A method for assembling a flow path assembly of a gas turbine engine, the flow path assembly including a first component, a second component adjacent the first component, a retention member, and a discourager for discouraging fluid flow between the first component and the second component, the method comprising:
   positioning the first component and the second component within the flow path assembly; and
   positioning the discourager within the flow path assembly,
   wherein the discourager comprises a first contact surface in contact with the first component, a second contact surface in contact with the second component, and a body connecting the first contact surface and the second contact surface, the body defining a pocket that is radially aligned with either the first contact surface or the second contact surface,
   wherein the first component is a turbine nozzle and the second component is a shroud, and
   wherein the retention member is received in the pocket when the discourager is positioned within the flow path assembly such that both the retention member and the pocket are radially aligned with either the first contact surface or the second contact surface.

14. The method of claim 13, further comprising:
   assembling a plurality of shroud sub-assemblies, each shroud sub-assembly comprising a shroud segment, a shroud hanger segment, and a discourager segment, the plurality of shroud segments forming the shroud and the plurality of discourager segments forming the discourager; and
   assembling the plurality of shroud sub-assemblies to form a shroud structure such that positioning the second component and the discourager within the flow path assembly comprises positioning the shroud structure within the flow path assembly.

15. The method of claim 13, wherein the discourager is positioned within the flow path assembly after the first component and the second component are each positioned within the flow path assembly.

16. The method of claim 13, wherein the turbine nozzle is formed from a ceramic matrix composite material, and wherein the shroud is formed from a ceramic matrix composite material.

* * * * *